(12) United States Patent
Malandain et al.

(10) Patent No.: US 7,890,485 B2
(45) Date of Patent: Feb. 15, 2011

(54) KNOWLEDGE MANAGEMENT TOOL

(76) Inventors: Tony Malandain, 70 W. Red Oak La., White Plains, NY (US) 10604; Guy Mounier, 70 W. Red Oak La., White Plains, NY (US) 10604; Martin Muldoon, 70 W. Red Oak La., White Plains, NY (US) 10604

( * ) Notice: Subject to any disclaimer, the term of this patent is extended or adjusted under 35 U.S.C. 154(b) by 0 days.

(21) Appl. No.: 11/545,347

(22) Filed: Oct. 4, 2006

(65) Prior Publication Data
US 2007/0244867 A1 Oct. 18, 2007

Related U.S. Application Data

(63) Continuation-in-part of application No. 11/403,697, filed on Apr. 13, 2006.

(51) Int. Cl.
*G06F 7/00* (2006.01)
(52) U.S. Cl. ...................................................... 707/705
(58) Field of Classification Search ............... 707/6, 707/705
See application file for complete search history.

(56) References Cited

U.S. PATENT DOCUMENTS

| | | | |
|---|---|---|---|
| 5,446,891 A | 8/1995 | Kaplan et al. | |
| 5,848,396 A | 12/1998 | Gerace | |
| 5,991,735 A | 11/1999 | Gerace | |
| 6,078,916 A | 6/2000 | Culliss | |
| 6,370,526 B1 | 4/2002 | Agrawal et al. | |
| 6,385,619 B1 | 5/2002 | Eichstaedt et al. | |
| 6,421,675 B1 | 7/2002 | Ryan et al. | |
| 6,473,752 B1 | 10/2002 | Fleming, III | |
| 6,507,841 B2 | 1/2003 | Riverieulx de Varax | |
| 2002/0095454 A1* | 7/2002 | Reed et al. | 709/201 |
| 2002/0123359 A1* | 9/2002 | Wei et al. | 455/466 |
| 2003/0126136 A1* | 7/2003 | Omoigui | 707/10 |
| 2006/0058987 A1* | 3/2006 | Kumar et al. | 703/2 |
| 2007/0161150 A1* | 7/2007 | Morrow | 438/106 |

* cited by examiner

*Primary Examiner*—Charles Rones
*Assistant Examiner*—Fazlul Quader
(74) *Attorney, Agent, or Firm*—Jeffrey Sonnabend; SonnabendLaw

(57) ABSTRACT

A document processor for use with an indexing application comprising: a content extractor proxy that implements a predefined programmatic interface for content extractors; a data store; and an extended document metadata processor; wherein: the content extractor proxy receives a signal from the indexing application identifying a target document; and the document metadata processor creates from the target document extended document metadata for storage in the data store.

22 Claims, 5 Drawing Sheets

KNOWLEDGE MANAGEMENT TOOL

CROSS REFERENCE TO RELATED APPLICATIONS

The present application is a continuation-in-part of the co-pending application Ser. No. 11/403,697, filed Apr. 13, 2006.

REFERENCE TO COMPUTER LISTING APPENDIX

Appendix A to this application is set forth on a single compact disc and the material recorded thereon is incorporated by reference herein. The following files are recorded on the compact disc:

| File Date and Time | File Size (bytes) | File Name |
|---|---|---|
| Nov. 21, 2005 09:22 AM | 631 | LogEntry.cs |
| Jan. 16, 2006 06:53 PM | 9,571 | LongitudeService.asmx.cs |
| Feb. 21, 2006 06:33 PM | 7,095 | PopularityManager.cs |
| Jan. 16, 2006 06:53 PM | 3,319 | SequentialExecutor.cs |
| Nov. 21, 2005 09:22 AM | 2,501 | UsersActivityLog.cs |
| Jan. 16, 2006 06:53 PM | 1,686 | DownloadProxy.cs |
| Mar. 31, 2006 08:54 PM | 5,780 | HitProxy.cs |
| Jun. 02, 2006 05:53 PM | 16,260 | PageDocumentHelper.cs |
| 8 File(s) | 46,843 bytes | |

A duplicate copy of the compact disc of Appendix A has also been submitted. Each of the discs was created on Aug. 2, 2006.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The instant invention relates to "enterprise search engines" and "knowledge management tools".

2. Background of the Related Art

According to some sources, corporate information doubles every twelve to eighteen months, making increasingly difficult information retrieval by employees. These sources indicate that the average employee spends one to two hours each day looking for information, finding the information sought roughly 50% of the time. Such inefficiencies impact companies' bottom lines.

While internet search engines such as Google have grown increasingly sophisticated and efficient, they have little application in the corporate context, due in large part to the nature of corporate information. Enterprise documents are often large, complex and multi-topical, and exist in a wide array or document formats. Because of the lack of adequate enterprise indexing, search and retrieval tools, employees often search for information on a document-by-document basis, downloading and reviewing individual documents in an effort to locate the desired information and relevant document page or pages. Inefficiencies in enterprise search and retrieval tools lead to unsatisfactory user experiences, leaving users less inclined to re-use such tools.

To the extent that search tools have been implemented in the corporate context, they have generally been ineffective at properly determining search result relevancy. One attempt to improve search result relevancy determinations is disclosed in U.S. Pat. No. 6,434,550 to Warner et al. entitled "Temporal Updates of Relevancy Rating of Retrieved Information in an Information Search System." Warner discloses an information retrieval system which monitors user actions to determine relevancy of retrieved documents. Specifically, Warner discloses a system that decreases relevancy rankings for documents retrieved in a first search upon a user running second and subsequent searches. Relevancy rankings thus determined are based on certain assumptions regarding user behavior, namely, that by conducting further searches, a user has indicated dissatisfaction with previous search results. This assumption is likely faulty in many, if not most, circumstances. Furthermore, the system of Warner provides no mechanism for assuring with any level of confidence that documents downloaded by users are actually desired by such users based on any informed decision by such users to download such documents.

With these considerations in mind, it is desirable to have an enterprise search engine that enables the user to quickly and seamlessly navigate through a subset of document pages to determine relevance of the information at hand. It is further desirable to have an Enterprise search engine that decomposes documents into individual pages and transforms the decomposed pages into standard page depiction formats such as XPS, PDF, XML/XSL, XHTML, HGML, SVG or bitmap based formats. It is further desirable to generate document relevance and/or desirability information based on user activities and knowledgeable interaction with documents. Finally, it is desirable to identify and/or create social and enterprise relationships based on information learned from user interaction with documents and/or search activities.

SUMMARY OF THE INVENTION

The subject invention is directed to a new and useful method of document indexing, searching and retrieval, as well as related information capture, organization, retrieval and distribution, and a device for the same. Generally, enterprise search engines are designed to search for information contained within electronic documents and other electronic information stores, and they are generally utilized within a company or other entity. The instant invention may find equal applicability both within an entity and across several entities or the general population. The instant invention may be deployed as an "appliance"; that is, as computer hardware and/or software dedicated to performing the tasks of the instant invention, or it may be distributed as non-dedicated hardware and/or software.

As used herein, program modules, software modules and like references indicate logical program units and do not necessarily indicate structurally discreet structures. The modules disclosed herein may be combined and/or further separated without departing from the inventive aspects of the present invention. Furthermore, the invention may be practiced in distributed computing environments wherein modules reside and/or are executed on several processing devices. In such a distributed computing environment, program modules may be located in both local and remote memory storage devices.

The instant invention includes means for indexing source documents, for searching indexed documents, for displaying results of such searches, and for maintaining relevance information on searched and retrieved documents by direct capture of feedback from users. The subject invention present several useful, novel and non-obvious departures from the prior art, including, among others: an extended document metadata creation engine; document decomposition and transformation; enhanced search result display including contextual snapshotting (i.e., previewing retrieved documents showing search terms and the like in the greater context of the document, in whole or in part); real-time user interaction data capture and analysis; social networking and enhanced user collaboration; automatic user profiling and people searching; and personal user data maintenance.

Extended Document Metadata Processing Engine

One important departure from the prior art by the present invention is an extended document metadata creation engine. As used herein, "metadata" may include any information about a document, as well as direct document data. Importantly, "metadata", as used herein, should not be construed to limit the types of data obtained from or about a document. Also, as used herein, "document" means any content, including without limitation, traditional computer document files, web pages, databases and the like.

The present invention may use programmatic interfaces (sometimes referred to as "hooks" or "API's") and existing, commercially available indexing applications (also called "indexing engines"), such as Microsoft Corporation's Share-Point Portal Server 2003, for example, to obtain document data and attributes as the indexing application indexes the documents. As used herein, references to "SharePoint", "SharePoint Portal Server" and the like expressly include successor products to Microsoft Corporation's SharePoint Portal Server 2003, regardless of the designated name of such product.

During and as a result of this process, the present invention may perform several tasks. First, as the indexing engine indexes source documents, the instant invention may utilize a hook to retrieve, substantially simultaneously with the indexing engine, the current source document being indexed by the indexing engine. Alternatively, the instant invention may maintain a list of source documents indexed by the indexing engine and retrieve the document for processing at a later point in time. In a like manner, the instant invention may utilize a hook to retrieve metadata such as file attributes from the underlying computer file system from the indexing engine. As with the document data, the instant invention may do so substantially simultaneously with the indexing engine, or the instant invention may maintain a list of source documents indexed by the indexing engine and retrieve the document metadata at a later point in time.

Regardless of when the actual processing of document data and metadata is done, the instant invention may generate a unique identifier for the source document. Such unique identifier may be a Globally Unique Identifier ("GUID") as specified by the Microsoft Corporation, a Universally Unique Identifier ("UUID") as specified by the Open Software Foundation, or any other identifier which unambiguously identifies a particular source document and differentiates it from other source documents. The unique identifier may be unique only to the system on which it was generated, or may be unique across a super-set of such systems. The system may use the unique identifier for later access and reference to documents or portions thereof which have been indexed.

Next, during processing, the instant invention may analyze document data to extract or otherwise create document metadata. Such metadata may include, among other data: document type; authorship information; topical information; document language or languages; document word count; syntactical information; publishing information; contextual usage information; and document creation, modification and last access dates. The instant invention may also analyze some or all of the metadata processed by the indexing engine and generate additional metadata therefrom. New metadata can be created based on existing document attributes such as document source, size, creator information, owner information, document date and revision history, among others. For example, page snapshots in a W3C-supported format can be produced out of the original document. Dynamic summaries can also be produced at query time based on the keywords used by the user. Based on document usage and consumption, certain metrics such as author, publisher, and document popularity can be added to the document profile as new metadata fields. A final step in the processing executed by the instant invention may be storage of the extracted and/or created document metadata in a database or other data structure maintained by the instant invention.

Document Decomposition and Transformation

Other steps which the instant invention may execute on source documents during processing may include document decomposition and transformation. While these two steps are discussed below in a particular order, they may be reversed or combined with other steps in other orderings without departing from the instant invention.

First, the instant invention may decompose multiple page source documents into individual pages. In some instances, the determination of page-break locations, that is, the determination of what constitutes an individual page of the source document, may be readily apparent from the source document itself. For example, in the case of a word processing document such as a document formatted for Microsoft Corporation's Word wordprocessor, the source document will contain codes indicating where page breaks exist within the document. The instant invention may simply utilized these page break codes to determine how to decompose the source document. In other instances, the decomposition of source documents may require certain algorithms to determine where page breaks exist or where they may be appropriately placed. For example, where a source document consists of a relational database table or tables, no inherent page breaks may exist, and so the instant invention would make page break determinations based on an analysis of the source document, and/or based on fixed and/or heuristic page formatting rules.

Next, the instant invention may transform source documents from their native format such as Microsoft Corporation's Word, PowerPoint, and Excel document formats, other word processor and spreadsheet format, page description language and page layout formats such as Adobe Systems Incorporated's Encapsulated Postscript, Postscript and portable document format data formats, as well as any other native format, into a desired output format. Output formats may include, among others, W3C compliant formats such as HTML, JPEG, and SVG file formats, and may also include proprietary or non-W3C compliant file formats. The transformed documents may then be stored in a database or other data structure maintained or controlled by the instant invention.

During transformation, the instant invention may maintain formatting of the source document. Such formatting may include page layouts, page dimensions, typefaces (including style and size), graphical content, and the like.

Enhanced Search Result Display Including Contextual Snapshotting

The instant invention may provide users with an enhanced search result display (a "user interface"), including a contextual snapshot of the documents and/or document pages retrieved as a result of the search performed. More specifically, the instant invention may display to users a page image of a page from a source document which retains all or a substantial portion of the original format of such page. In this display, search terms entered by the user may be highlighted. A user may be shown the results of his or her search with a large degree of supporting context, thereby facilitating a meaningful, efficient review of search results. The user interface may also display information such as: document source, size, creator information, owner information, document date and revision history, among others.

The user interface may also display a dynamic summary of the most relevant pages of the documents, highlighting key snippets of text across the relevant pages of the document, and may be configurable by a system administrator.

The user interface may be divided into different sections, which in turn may be contained in multiple display "panels". A first panel may display a topic list, also referred to as a "taxonomy". This list may be in the form of an expandable and collapsible hierarchal outline. In this view, search results may be grouped into hierarchies of individual topics, document types, analogous searches conducted by other users, document availability, or any other pertinent grouping parameter. By grouping search results, users are presented with important information about the search results readily and intuitively comprehendible by the user.

A second panel may include a search result document listing, which may include a query-based summary of each document; that is, it may include contextual snippets or other information which relate to the user's query. In this manner, the user may quickly gain a fundamental understanding of the relevance of each document returned by the search without the need to review entire documents or substantial portions thereof, thereby improving the efficiency of the search and review process. The search result document listing may show all of the documents retrieved, or may be variously filtered to show only a subset of documents retrieved such as the subset of documents contained in the currently selected group in the taxonomy panel.

A third panel may contain a document preview, which may be a preview of a single page of a retrieved document and which may include highlighting or other indicators of search terms contained in such document or document page. In particular, the third panel may display a single document page. This singe document page may be from a processed multi-page source document which the instant invention had previously decomposed, transformed and stored in its internal database or other data structure. By properly decomposing and transforming source documents and subsequently displaying highlighted search terms, the instant invention presents a "contextual snapshot" of a retrieved document which permits a user to quickly and accurately determine the relevance of the retrieved document to the intended search.

By decomposing documents, individual, fully formatted document pages may be stored and easily retrieved for display in search results without the need to retrieve full documents prior to viewing by the user. This speeds the search result review process and leads to an improved user experience. Likewise, because documents are stored after being transformed, there exists no need for multiple dedicated native format viewers, but only for viewers of the transformed format.

In all panels, the instant invention may present to users navigational elements that permit the user to navigate through the taxonomy, search results, and individual documents and document pages. Navigational elements may include, among others, "first", "last", "top", "bottom", "next" and "previous" elements for navigation to appropriate locations. For example, a "first" navigational element in the third panel previously discussed may navigate a user to the first document page of a current document, while a "first" navigational element in the second panel discussed above may navigate a user to a first document of several retrieved by a search. The foregoing examples of navigational elements are not meant to be limiting, and those of ordinary skill in the art will readily appreciate that other forms of navigational elements may be utilized.

In addition to navigational elements, each panel may include relevance indicators for the various elements displayed in the panel. For example, the taxonomy panel may include a relevance indicator for each group displayed in the panel. The user may quickly assess these relevance indicators to determine the relative relevance of each group as compared to other groups, or to determine the overall relevance of the results of his query. By way of further example, the search result document panel may show relevance indicators for the various documents contained in the panel, thereby guiding the user in his review of the documents. As a final example, the document preview panel may show relevance information for individual pages of a document relative to all pages of all documents within the search results, or relative to other pages of the same document. Other relevance indicators in addition to the examples discussed here may also be utilized and may include any relevant absolute or comparative relevance measure.

Real Time User Interaction Data Capture and Analysis

The user interface may permit users to mark documents for further review, to retrieve or discard documents, or to rank document relevance, among other substantive user tasks. By capturing these types of user input, as well as the associated queries and documents selected for viewing, the instant invention may interactively and in real time assess document relevance, adjust global document scoring and perform any other calculations or assessments of documents based on user interaction with such documents.

More specifically, the instant invention may analyze predetermined discreet user behaviors to assess document popularity and/or relevance, as well as overall search result popularity and/or relevance. The popularity of a document may be deduced from two measures, among others, namely the number of times the document has been previewed; and the number of times the document has been "downloaded," particularly where downloading occurs only after previewing. Other actions in addition to or in place of downloading may also be utilized, including among others purchasing the document, linking to the document (which may include adding the document to a "favorites" list or bookmark list), copying information from the document (which may include "cutting and pasting" information from the document), printing the document and/or emailing the document.

The relevancy of a particular document to a particular search may be deduced, among other ways, by analyzing the popularity of the document in the context of the search conducted. For example, the popularity of a document in the context of a particular search may be determined from data stored in a Relevant Keyword List or Relevant Concept List, discussed in detail below. This popularity in the context of the search may be used to determine the relevancy of the document to the search.

The formula used to derive the popularity and/or relevancy score thus described may be any formula that reflects the relative weights of the previously described user behaviors, may be determined through empirical means, and may include search information to determine relevancy. The implementation should be flexible enough to allow for changing the score computation algorithm as different, more desirable ranking algorithms and formulae are determined.

By way of example, one may consider the following user interaction and associated document ranking. First, a user runs a search query. The system of the present invention returns search results in the form of a list of items containing or relating to the searched keywords (as used herein, "keywords" may include, among others, individual words, phrases or Boolean expressions). Next, the user may preview one or more documents by selecting such documents for preview via the user interface, as one of skill in the art will readily understand. The preview count popularity rating indicator for each of these documents is increased by one. Finally, the user may decide to download one or more documents via the user interface. These documents are then made available to the user and the download counts and relevant keywords popularity rating indicators for this document are increased by one. These indicators are in addition to the preview popularity rating indicators, which have already been increased in the previous step.

By providing contextual previews of documents (i.e., contextual snapshots), the system of the present invention obtains a higher confidence of user intent and/or interest in connection with downloaded documents. This heightened confidence is directly attributable to the enforced preview prior to download, which reduces or eliminates the downloading of documents for the purpose of review. Instead, users are presented with a preview of selected documents showing search-relevant context prior to downloading. Thus, users have been "educated" regarding document relevance or desirability prior to downloading, resulting in increased system confidence that downloaded documents actually have heightened value or interest. By leveraging the human judgment inherent in the preview-before-download decision making process, the system of the present invention provides a document ranking mechanism having a greater degree of accuracy than previously known. Furthermore, the present invention accomplishes the improved accuracy ranking in a manner transparent to the user.

The system of the present invention may rely on other actions in addition or in place of downloading to determine document value or interest, including among others emailing and printing documents after preview.

The system of the present invention, after analyzing predetermined discreet user behaviors to assess document popularity or importance as described to determine relative relevancy of various documents, may analyze different metadata for such documents to determine whether any metadata attributes are common to a particular population of documents. For example, the system of the present invention may assess a series of documents determined through user interaction monitoring to be highly relevant to a particular search. The system of the present invention may then analyze the dates, source locations, authors, and the like for such documents. If this analysis indicates that highly ranked documents are from a common source (e.g., the accounting department), for example, then the system may rank more highly other documents from the same source in similar, future searches.

In a like manner, by capturing the relevant query parameters, including among others query terms, filters and target corpus, as well as user actions, the instant invention may formulate topical correlations between various queries entered by one or more users. The instant invention may subsequently use the correlational data to suggest to users query terms, filters and target corpus based on searches being conducted by such users. For example, the instant invention may capture user interactions of a user who is searching his company's presentation files for information regarding a certain product. The user may view many documents, transparently marking a large percentage as useful, and from this, the system may conclude that the search was effective, therefore scoring it highly for the particular topic searched, e.g., the product. If a later user begins searching word processing documents from her company's marketing department for information on the same product, the instant invention may suggest to the latter user, based on a correlation between searches, that she search the company's presentation files as well. While this example may be somewhat simplified, it serves to illustrate the concept embodied by the instant invention, and more complicated heuristic methodologies may be applied to the correlative analysis.

Additionally, the instant invention may include in search results documents which fall outside the scope of a user's permissions (e.g., document which the user is not permitted to read for security purposes), but which the instant invention determines are relevant based on correlative data. In such a case, these additional documents may be grouped separately in the taxonomy panel, or may be otherwise distinguished from other documents without disclosing the full content of such documents.

The instant invention may also permit users to assemble ad-hoc collections of individual document pages into virtual documents. By capturing these user actions, the instant invention may make further analyses of document relevance, similarity and other information. For example, a user may conduct two different, apparently dissimilar searches. The user may then select one or more document pages from each search to be combined in a virtual document. The system of the present invention may conclude from the user's actions of combining document pages that the pages bear some relation to one another despite their apparent non-similarity.

The instant invention may also use captured user interaction data and associated query data to establish and maintain statistics and other analyses of overall document populations. For example, the system may calculate and provide usage reports such as missing content; popular content areas; qualitative and quantitative contribution by author, department and the like; and others.

Interactive data may be stored and referenced for use in future searches by the same or different users. In this manner, the system may analyze search terms and other parameters of searches to determine whether such searches correlated substantively with earlier searches (e.g., by heuristically or otherwise determining that a user is seeking the same or similar information to that sought in earlier searches). When the system determines that a new search correlates to some degree with an earlier search, it can then utilize the previously stored interactive data to assist in the ranking of results for the new search, for example, by ranking higher those documents in the result set which the previously stored interactive data suggest is more valuable.

Social Networking and Enhanced User Collaboration

In addition to analyses of document corpuses, the instant invention may utilize the captured user interaction data to perform certain analyses, including, among others, analyses of areas of interest of individual users, departments and the like. As a result of these analyses, the instant invention may quantify relationship strengths between and among users in the form of scored or ranked "connections" between and among users, thereby facilitating enhanced collaboration amongst users.

The instant invention may build individual user profiles, community profiles, and correlations between these profiles to facilitate the creation of social networks within and across organizations. The facilitated social network may map social connections between and among users, user groups and other community sub-sets and super-sets. For example, the instant invention may connect User 1 and User 2 based on a correlated interested in Topic 1. The system may also connect User 2 and User 3 based on a correlated interest in Topic 2. As a result, the system may find a connection between User 1 and User 3, via User 2 based on these correlated interests. The system may score or rank the connection between User 1 and User 3 lower than the connections between User 1 and User 2 on the one hand, and User 2 and User 3 on the other, because the connection between the former connections are direct, while the latter connection is via an intermediate user. Likewise the instant invention may adjust the rank or score of the indirect connection up or down based on the correlation between correlated Interest 1 and Interest 2; that is, based on correlated similarities between these interests.

The instant invention may also process and analyze e-mail and other electronic communications between users to augment the analysis of captured user interaction data and interest correlations. Such e-mail and other interactions may be stored in a database or other data structure, and the system may analyze aspects of e-mail and other interactions between users to adjust the rank or score of connections between such users. Among other aspects of e-mails and other communications which the instant invention may analyze are: the substantive content of the communications; the frequency of the communications; the elapsed time between communications; the ratio of responses communications; and the like.

Social network data generated and maintained by the instant invention may be used to suggest points of contact and collaboration opportunities to users. For example, the system may analyze a user's query and present to that user not only documents relevant to the query, but also other users who may have relevant knowledge based on the system's social network data.

The foregoing analyses may be repeated so as to extend throughout a social structure such as an institution (or across institutions), and may include analyses of any pertinent data. Similarly, the instant invention may maintain user profile data for any pertinent user attribute and may correlate users based on any of these attributes. All of the foregoing may be applied to groups of users in the same manner as applied to individual users. For example, the foregoing analyses and resulting conclusions may be applied to correlate groups of users with other groups of users.

Automatic User Profiling and People Searching

User behavior may be tracked and stored. User behavior includes user document creation; document check-in or check-out via a document management system; sending or receiving of documents via e-mail; and document previewing and/or downloading from the search result presented by a search engine. This information can be mined using traditional machine learning algorithms, including but not limited to text clustering, to infer user interest and expertise in specific topical areas. User interest may be measured by the number and type or previews, downloads, or e-mails received related to the topic of interest. By contrast, user expertise may be measured by the number and type of document published and previewed by others, e-mailed to others. In other words, the popularity of specific information topics produced by a user demonstrates its expertise to the group.

User profiles may be used in the context of information searches. For example, in the case of user interest profiles, information may be fed to a search engine to help it better predict the nature and topic of documents that would meet the user's expectations for the query as formulated. In the case of user expertise profiles, information may be fed to a search engine to help it put the most popular documents on top of less popular documents, even though semantic content of two documents, as measure by search engine rank, may dictate a different ordering of results.

Personal User Area

Certain embodiments of the present invention systematically tracks the usage and consumption of information by users. As a result, users may browse and search their search histories, i.e. documents viewed or downloaded, in a separate personal user area. Moreover, users may bookmark specific items or documents to indicate special interest. Retrieval of such bookmarked items or documents may be enabled via filter mechanisms in the personal user area.

Disclosed is a document processor for use with an indexing application comprising: a content extractor proxy that implements a pre-defined programmatic interface for content extractors; a data store; and an extended document metadata processor; wherein: the content extractor proxy receives a signal from the indexing application identifying a target document; and the document metadata processor creates from the target document extended document metadata for storage in the data store.

The content extractor proxy may signal a content extractor to extract content from the target document for the indexing application, and the document processor may copy the target document to a transfer folder and signal the extended document metadata processor to process from the target document extended document metadata for storage in the data store. The document processor may copy the target document by hard link. The content extractor proxy may signal a content extractor to extract content from the target document for the indexing application.

The document processor may also include a decomposition and transformation module, wherein the decomposition and transformation module decomposes and transforms the target document for storage in the data store.

Also disclosed is a method used in conjunction with an indexing application, the indexing application defining a programmatic interface for content extractors, a method comprising the steps of: receiving via the programmatic interface at a content extractor proxy signals from the indexing application identifying a target document; extracting from the target document extended document metadata; and storing the extended document metadata in a data store. The method may further comprise the step of signaling a content extractor to extract content from the target document for the indexing application. Additionally, the method may further comprise the steps of monitoring a transfer folder for documents copied thereto; copying the target document to the transfer folder; and generating a signal for initiating extended document metadata extraction from the target document in response to the copying. The method may further comprise the step of decomposing and transforming the target document. The decomposed and transformed document may be stored in the data store.

The method may also comprise the steps of monitoring a transfer folder for documents copied thereto; copying the target document to the transfer folder; and generating a signal for initiating extended document metadata processing from and decomposition and transformation of the target document in response to the copying.

In all embodiments, the programmatic interface may be an IFilter interface.

These and other aspects of the subject invention will become more readily apparent to those having ordinary skill in the art from the following detailed description of the invention taken in conjunction with the drawings described herein.

BRIEF DESCRIPTION OF THE DRAWINGS

So that those having ordinary skill in the art to which the subject invention pertains will more readily understand how to make and use the subject invention, preferred embodiments thereof will be described in detail herein with reference to the drawings.

DETAILED DESCRIPTION OF THE PREFERRED EMBODIMENTS

Figure 1:
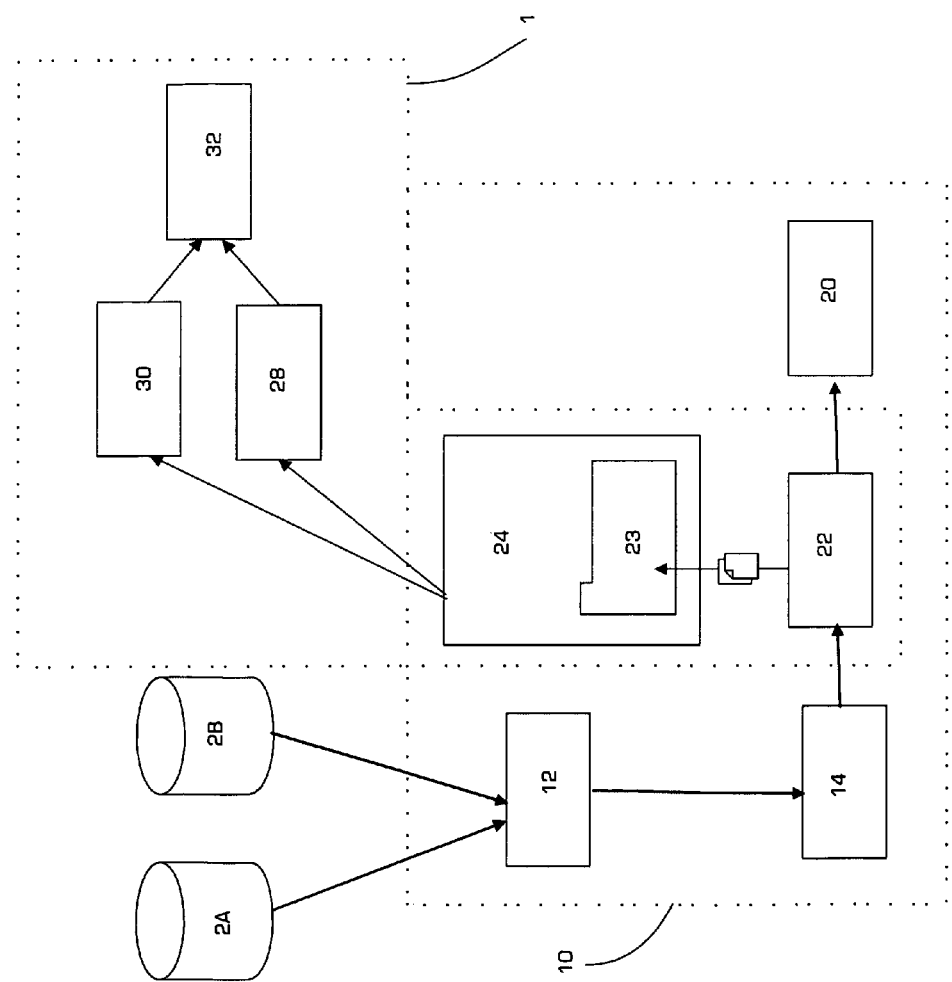
FIG. 1 is a system block diagram for a preferred embodiment of the present invention.

Referring now in detail to the drawings wherein like reference numerals identify similar structural features of the several embodiments of the subject invention, there is illustrated in FIG. 1 a system block diagram for a preferred embodiment of the present invention. Content sources 1 are any digital or digitized content that a user wishes to have indexed by the present invention. Content sources may include, among other sources, web site content 2A and computer files 2B. Computer files 1b may include, among other file types, word processing, spreadsheet, graphical, presentation (e.g., Microsoft Powerpoint), and page layout (e.g., Adobe PDF) files.

In one preferred embodiment, the indexing application 10 is Microsoft Corp.'s SharePoint Server. In this embodiment, protocol handler 12 accesses in its native format the content source to be indexed, as is more fully described in the article "Introduction to Protocol Handlers," located at http://msdn.microsoft.com/library/default.asp?url=/library/en-us/spssdk/html/_introduction_to_a_protocol_handler.asp and incorporated herein by reference. The protocol handler 12 passes the content to be indexed to the indexing engine 14 after retrieving it from its content source.

As normally implement, that is, as implemented without the present invention, indexing engine 14 requests a contract extractor to extract content data and metadata for the content source being indexed. The content extractor extracts the content, usually in plain text format, and passes it back to the indexing engine 14 for further processing and/or storage.

In the present invention, the content extractor is implemented by the present invention and is inserted in place of the content extractor 20 normally found in or registered with the SharePoint Server. The content extractor proxy 22 implements the identical api hook, in the form of the "IFilter" interface, as the original content extractor, as well as any other interfaces which may be required such as IPersistFile and IPersistStorage, and is registered with the SharePoint Server to process the content ordinarily processed by the original content extractor. Thus, content extractor proxy 22 appears to indexing engine 14 as the normal content extractor, permitting normal operation of indexing application 10 despite the presence of the present invention.

After receiving the request from the indexing engine 14, content extractor proxy 22 signals the identity of the content to be indexed (i.e, the target document) to the extended document data extractor 28 and/or the decomposition and transformation module 30 for data extraction and/or other processing. In the present embodiment, the signal is initiated by copying the target document via hard link into transfer folder 23, which is being monitored by transfer folder monitor 24, which may monitor by means of operating system generated interrupts, by polling the transfer folder, or by any other means by which transfer folder monitor 24 can determine the existence of new documents in transfer folder 23. Where transfer folder 23 does not reside on the same server as indexing engine14, hard linking as previously described may not be possible, in which case the document may be copied by other means to transfer folder 23.

Transfer folder monitor 24, in turn, upon detecting the presence of a new document in transfer folder 23, signals extended document data extractor 28 and/or the decomposition and transformation module 30 to begin appropriate processing of the target document. This signaling may take any form, including those detailed above in connection with the operation of the transfer folder monitor 24; that is, transfer folder monitor 24 may copy or hard link documents to a folder monitored by document data extractor 28 and/or the decomposition and transformation module 30, such monitoring being by means of operating system generated interrupts, by polling the folder into which transfer folder monitor 24 copies the target document, or by any other means by which document data extractor 28 and/or the decomposition and transformation module 30 can determine the existence of a target document in the folder in question. Transfer folder monitor 24 may also signal document data extractor 28 and/or the decomposition and transformation module 30 independent of any folder, e.g., by means of inter- or intra-process messaging.

Transformation may be from a document's native format to SVG, for instance, by using a commercially available transformation product such as Software Mechanics Pty Ltd's SVG Maker software product (P.O. Box 1023 Milton Business Centre QLD 4064, Australia). The steps of transformation, decomposition and data extraction need not occur in any particular order, provided that pertinent information, such as pagination information, is maintained. For instance a document may be first transformed, then decomposed, and then had data extracted. The steps might also be reversed, or might occur partially or completely in parallel.

Upon completion of all processing of the target document by extended document data extractor 28 and/or the decomposition and transformation module 30 each module stores the relevant data in data store 32. The target document can then be deleted from transfer folder 23.

The extended document data extractor 28 is responsible for extracting document data and metadata for storage in an external data store maintained by the present invention; that is, the present invention extracts and stores information about indexed documents separate and apart from, and in addition to, the document data stored by the SharePoint server. The document data stored in data store 32 may include, among other data, page by page representations of the indexed document (i.e., after decomposition and transformation), including page layout information, concordance information and the like.

Content extractor proxy 22 may also be responsible for passing the document to be processed to the content extractor 20 for normal indexing. This may be facilitated by retrieving and storing the identity and/or address of the content extractor 20 during initiation of the content extractor proxy 22. Alternatively, the identity of a content extractor for a particular type of content may be known in advance, for example, as with Microsoft Corporation's content extractor for Microsoft Word word processing files and the like. The content extractor proxy 22 can then pass the document being processed to the original content extractor 20 utilizing the ordinary api hook such as the IFilter interface previously described. The content extractor proxy 22 can then receive back from the content extractor 20 extracted content, which content extractor proxy 22 may then pass back to indexing engine 14 for normal processing by that module.

Figure 2:
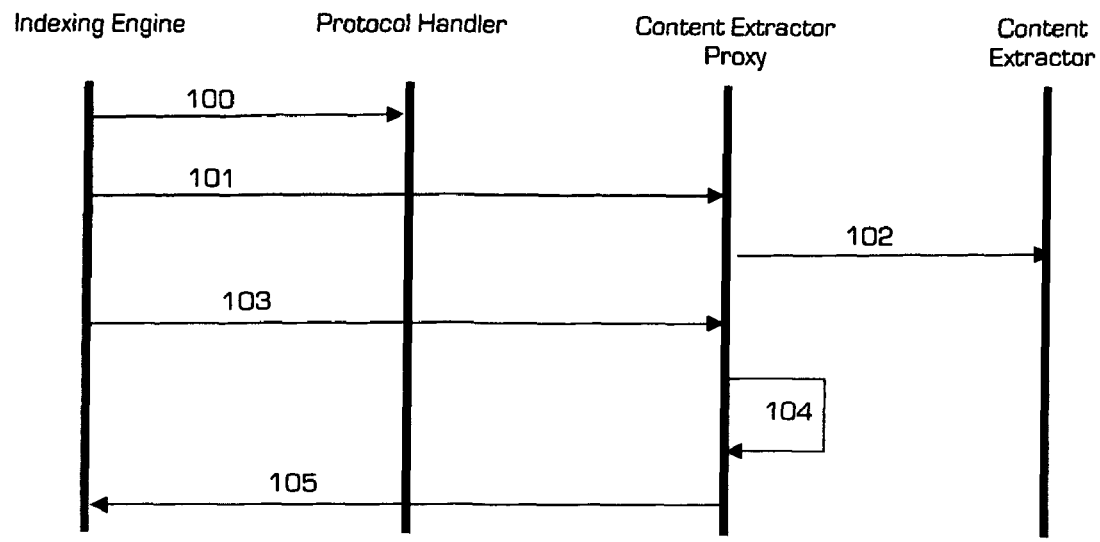
FIG. 2 is a timing diagram illustrating for a preferred embodiment the relative timing of the various steps of content acquisition and data extraction.

FIG. 2 presents a timing diagram illustrating the interaction between indexing engine 14, protocol handler 12, content extractor proxy 22 and content extractor 20 which occurs during the processing of a file or files in a preferred embodiment of the present invention. First, in step 100 indexing engine (or some other module of indexing application 10) passes a list of files to protocol handler 12. Protocol handler 12 retrieves the files from the appropriate content source or sources. Indexing engine 14 then signals content extractor proxy 22 in step 101 to retrieve the file contents (or simply passes the target file to content extractor proxy 22) to begin processing the file content. Content extractor proxy 22 initiates extended document data extraction signaling the availability and identity of the target document as discussed in detail above, and initiations normal content extraction in step 102, by passing the file to content extractor 20.

The file may be retrieved in "chunks," that is, in discreet portions. If so, the content extractor proxy 22 passes each chunk to content extractor 20 in step 102 as it is received from indexing engine 14 so as to mimic for content extractor 20 the operation of indexing engine 14. As each chunk or other portion of the overall file is processed by content extractor 20, the extracted content is passed back to indexing engine 14 via content extractor proxy 22. The final chunk is retrieved in step 103, at which point in step 104 file content is copied for decomposition, transformation, and/or storage in external data store of the present invention. Upon completion of normal file processing, i.e., processing by content extractor 20, content extractor proxy 22 signals indexing engine 14 in step 105 that file processing has finished.

The present invention may also store within the indexing application 10 a unique identifier for each document processed to permit association of data in the external data store of the present invention with the appropriate document stored in indexing application 10. This may be accomplished by utilizing SharePoint's document attribute functionality to store a GUID for each document. Because the extended data is keyed to the document data in indexing application 10, extended data extraction may be, but need not be, executed asynchronously.

Figure 3:
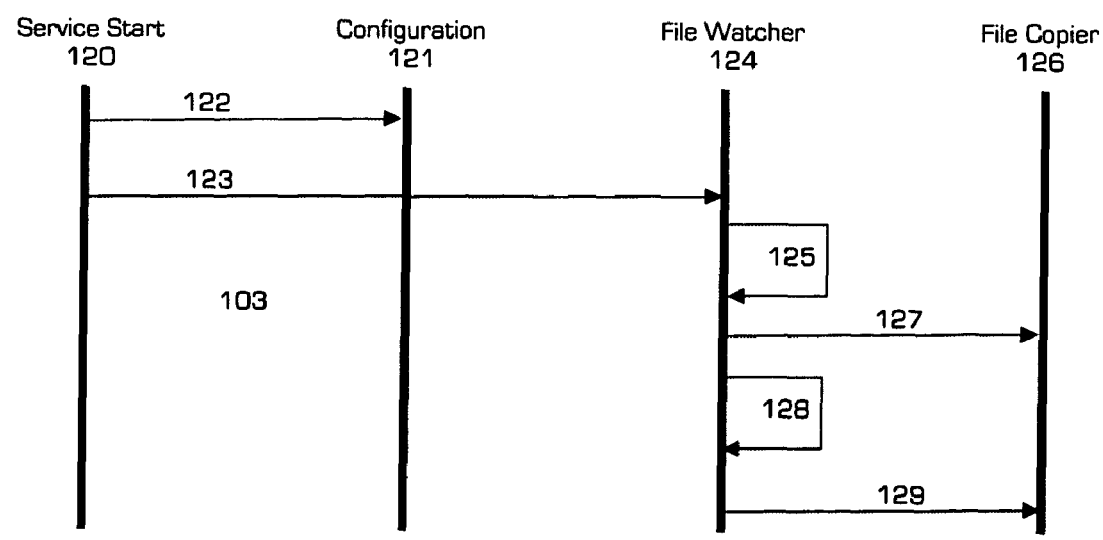
FIG. 3 is a timing diagram illustrating for a preferred embodiment the relative timing of the various steps for monitoring a transfer folder for new content.
Figure 4:
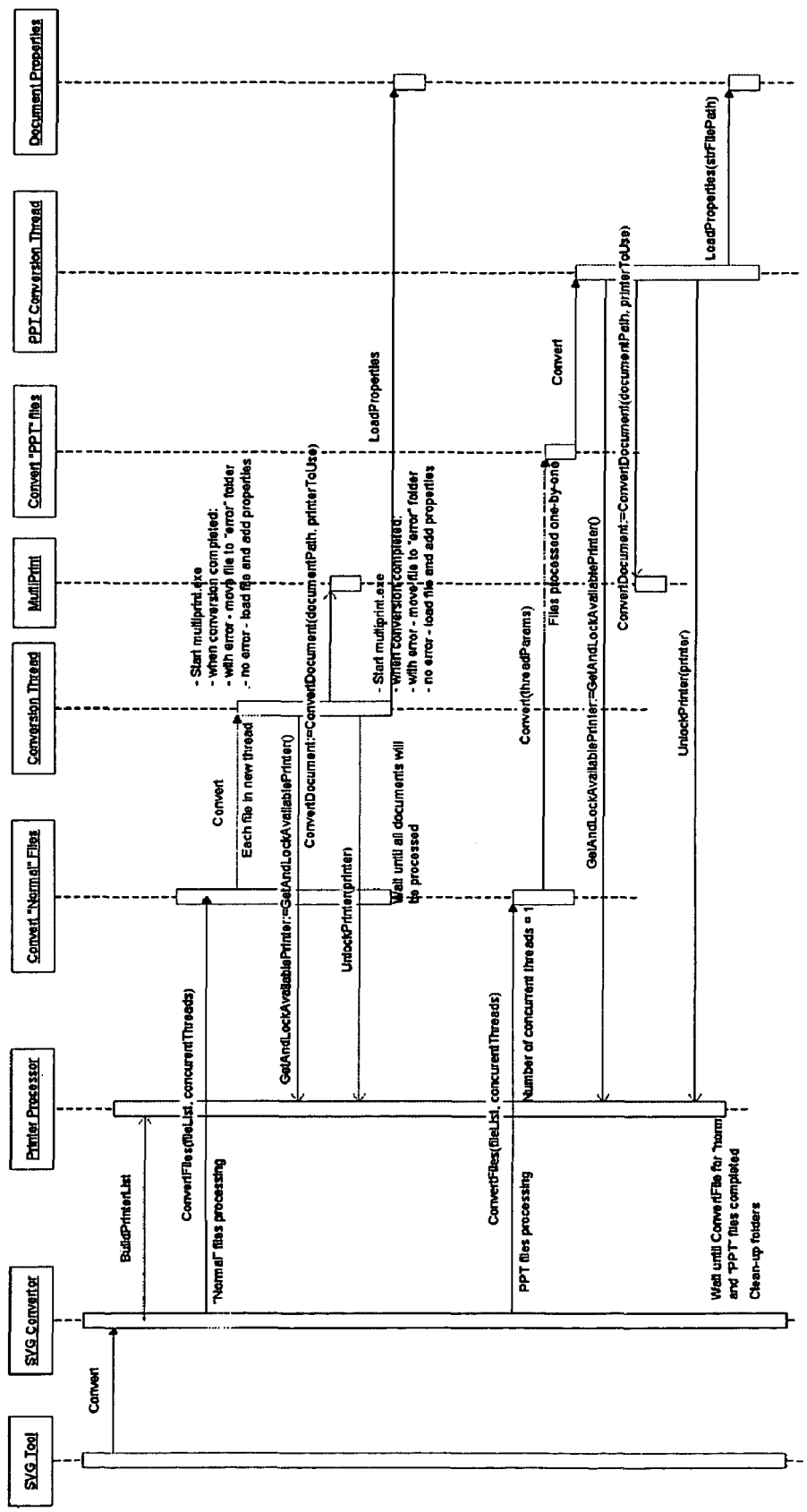
FIG. 4 is a timing diagram illustrating the relative timing of the various steps utilized to convert documents from their native formats to Scalable Vector Graphics format for storage and end user display in a preferred embodiment of the present invention.

Next, FIG. 3 illustrates the timing of the steps for monitoring a watch folder by the extended document metadata extractor of a preferred embodiment of the present invention. At service start, step 120, the monitoring module requests from configuration module 121 in step 122 a listing of file paths to monitor. For each folder returned by configuration module 121, the monitoring service initiates a file watcher module (i.e., a file watcher thread) 124, which, in turn, compares folders in step 125 to determine if the watched folder contains new content. Upon determining the presence of new content, file watcher 124 requests file copier module 126 to copy the content for further processing, such as decomposition and/or transformation from native format to another format, for example, to Scalable Vector Graphics format, and for storage in the document store of the present invention. File watcher 124 thereafter waits for changes to the contents of the watched folder in step 128, requesting copier module 126 to copy any changed content as just described.

In an alternate embodiment, the system of the present invention may replace protocol handler 12 (as shown in FIG. 1) with a proxy protocol handler in much the same manner as previously described in connection with content extractor proxy 22, above, or may otherwise intercept communications between protocol handler 12 and indexing engine 14 to identity of the target document. After being retrieved from its content source, the system of the present invention can process the target document thus identified as previously discussed.

Preferred embodiments of the present invention may process search requests from users and present to such users search results comprising search result sets. These embodiments may then permit users to preview contextual snapshots of documents contained in the search result set and to retrieve (i.e., "download") desirable documents after such preview. Following this, the embodiments may analyze predetermined discreet user behaviors to assess document popularity, relevance or importance, as well as overall search result popularity, relevance or importance based on user preview and retrieval of documents contained within a search result set.

Figure 5:
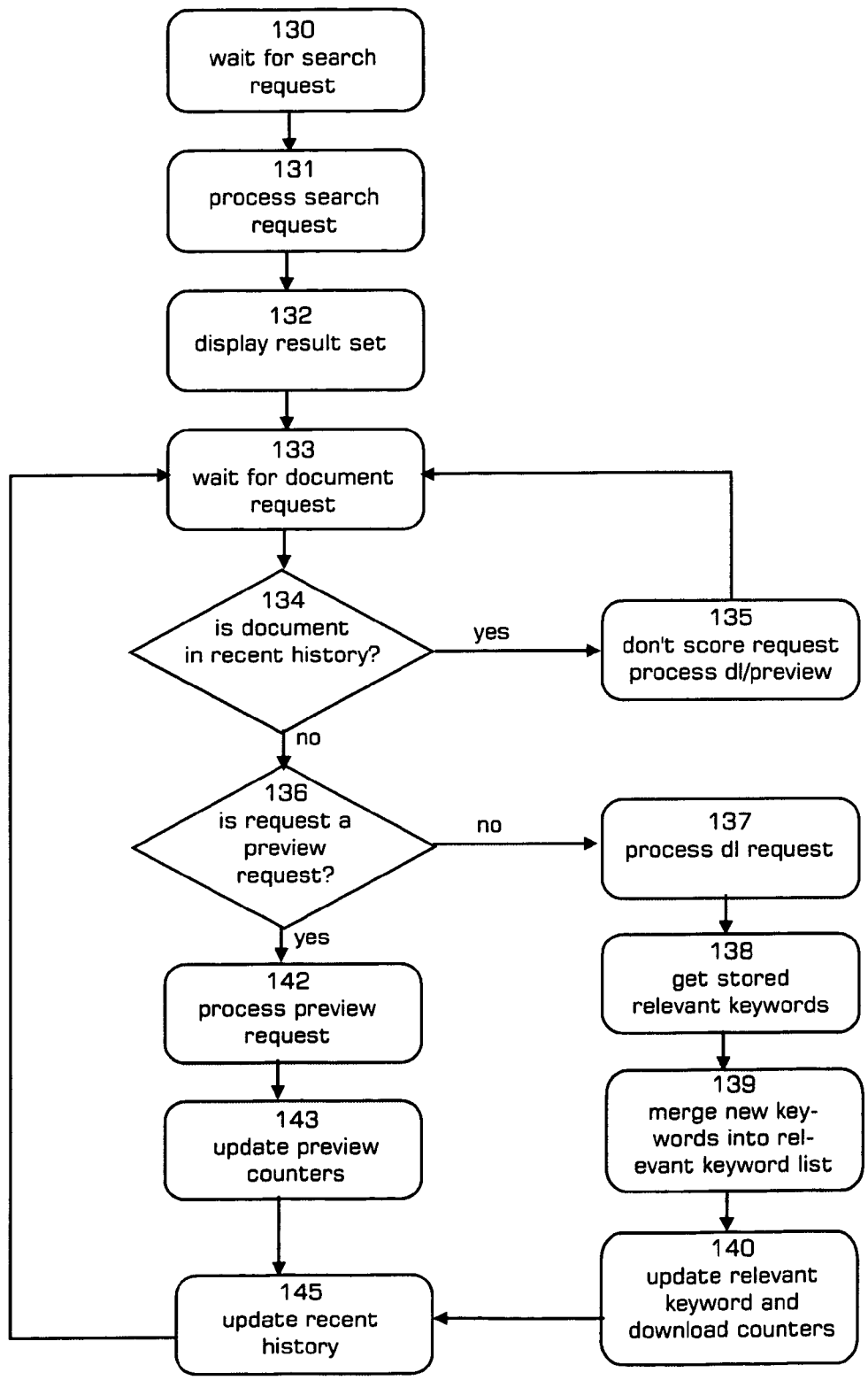
FIG. 5 is a flowchart illustrating the logical flow associated with search result relevance ranking of a preferred embodiment of the present invention.

Referring to FIG. 5, the previously described embodiments may implement the following logic. First, in step 130, the system waits for a search request from a user. Upon receiving such a request, the system process the search in step 131, as will be generally understood by those of skill in the art. The search result set is displayed to the user in step 132, and the system then waits for a document related request in step 133.

The search result set displayed in step 132 may display a popularity rating for each document in the result set. The popularity rating may be calculated using any data tending to show a document's popularity, desirability and/or relevance, or lack thereof. One such calculation of a preferred embodiment of the present invention utilizes the following data in calculating a document's popularity rating, each of which is discussed in further detail below: the document's preview count; the document's download count; and the intersection of keywords used to search for the document and the set of keywords associated with the document found in the Relevant Keyword List.

The idea of relevant keywords may be extended in the present invention to include relevant concepts derived from search keywords. Such embodiments may utilize heuristic methodologies, syntactical and contextual analyses and the like to derive from search keywords concepts embodied in or underlying such searches. These concepts may then be stored in a Relevant Concept List in the same manner as previously described for keyword storage in the Relevant Keyword List. Because relevant concepts may be expressed as individual keywords, a Relevant Concept List may be implemented as a Relevant Keyword List, that is, relevant concepts may be stored by storing individual or multiple keywords for such concept. Thus, a Relevant Keyword List may also be considered a Relevant Concept List, while a Relevant Concept List may, but is not required to, store more than just keywords (i.e., it may store more complex expressions of concepts than single keyword expressions).

Keywords and concepts associated with various documents may have an associated value or score in connection with such documents. Keyword or concept scoring may be calculated, among other ways, by tracking the frequency in which individual keywords or concepts are associated with a particular document, higher frequencies yielding an increased score for such keyword or concept in connection with such document. Keywords or concepts with the highest scores may be considered "key keywords" or "key concepts," indicating a particularly high score. The system of the present invention may utilize keyword and concept scoring, among other uses, to flag for users "Best Bet" documents in result sets, that is, documents most likely to be of interest based to the user.

Upon receiving a document related request, the system first determines in step 134 if the request relates to a document that was the subject of a different, recent request by the user. If so, the system in step 135 ignores the request for purposes of popularity scoring, processing the request by presenting a preview or transmitting the document, according to the type of request, without incrementing any scoring. The system then returns to step 133 to wait for the next document related request.

If in step 134 the system determines that the request does not relate to a document that was the subject of a different, recent request by the user, the system determines in step 136 whether the request is to preview the document, that is, to view in context the relevant portions of the document.

Figure 6:
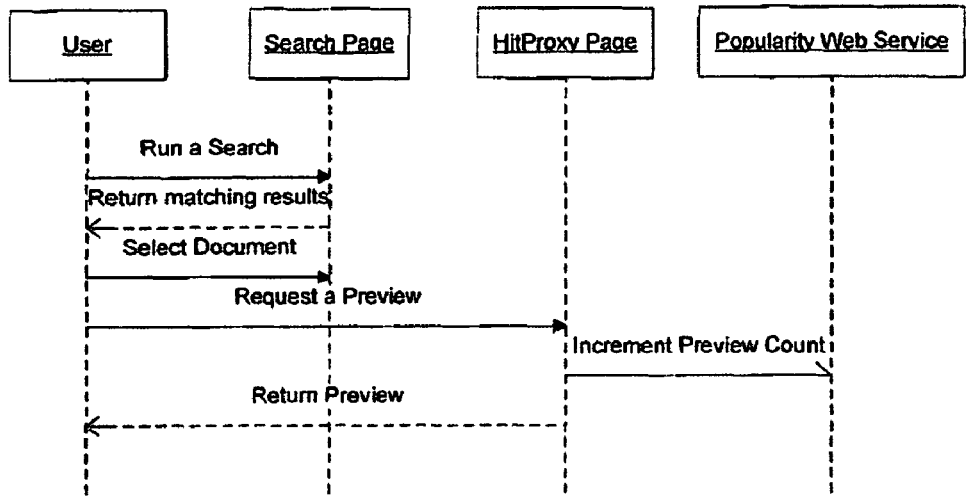
FIG. 6 is a timing diagram illustrating the relative timing of the various steps utilized to process user preview requests.

In the event the system determines in step 136 that the user has requested to preview the document, the system processes the request in step 142 by retrieving the previously decomposed and transformed document, as described above, and transmitting relevant portions, such as those containing search keywords, for the user to preview. Next the system increments the preview counter for the document in question (i.e., it increments the running counter of previews for the document) in step 143. This step may include storing the incremented preview counter in a non-volatile manner, for example, to a disk based file or persistent database. FIG. 6 depicts the logical timing of the steps just described. Alternatively, step 142 may be completed after the processing of step 143, the relative order of these two steps being of no consequence.

Instead of simply updating the document's preview counter in step 143, systems embodying the present invention may perform more complex calculations to determine a proper value to record for the document, and also may process the keywords associated with the search as in steps 138 through 140, discussed further below.

Figure 7:
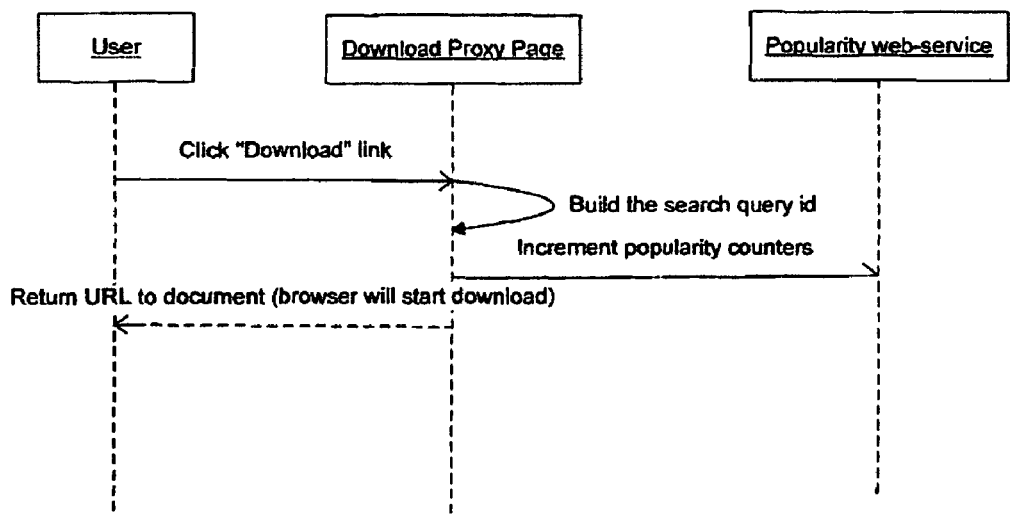
FIG. 7 is a timing diagram illustrating the relative timing of the various steps utilized to process user download requests.

If in step 136 the system determines the request to be one to download the document, the system retrieves and transmits the document to the user in step 137. Next, in steps 138 through 140, the system retrieves the keywords for the search, merges the keywords into a list of searched keywords maintained by the system on a document-by-document and/or search-by-search basis (the "Relevant Keyword List"), and updates keyword and download counters for the search and document being processed. This step may include storing the incremented download counter and/or Relevant Keyword List in a non-volatile manner, for example, to disk based files or persistent database. FIG. 7 depicts the logical timing of the steps just described. Alternatively, step 137 may be completed after the processing of steps 138 through 140, the relative order of these two sequences (i.e., step 137 on the one hand and steps 138 through 140 collectively on the other hand) being of no consequence.

As with the preview counter discussed previously, the present invention may perform more complex calculations to determine a proper value to record for the document due to the user's download action.

The system may enforce a preview-before-download logic flow within the user interface logic (e.g., the user interface logic will first display a preview option to the user but no download option, displaying a download option only after the user has previewed the document), within the module implementing step 136 (e.g., by tracking user actions on a user-by-user, document-by-document basis and permitting download only after preview), or through any other means as will be readily understood by one of skill in the art. In the event that the system does not enforce preview-before-download (e.g., in step 136 as described above), the system may determine prior to step 138 whether the user has previously previewed the document, and, if not, may skip or alter the scoring of steps 138 through 140 to reflect the lessened confidence (i.e., the absence of confidence derived from the human judgment inherent in the preview-before-download decision making process), while still permitting download of the document.

The preview-before-download logic may consider any preview by the user as sufficient to satisfy the preview-before-download requirement, that is without regard to when the user previewed the document, or may consider only previews within the same user session (i.e., in connection with the same search or group of searches) as sufficient to satisfy the preview-before-download requirement, or may consider only previews within a certain time period to be sufficient to satisfy the preview-before-download requirement.

The system proceeds to step 145 from either step 143 or step 140, updating the recent history for the document by recording in the system the user actions just completed for the document, including, among other possible information, the nature of the action taken (i.e., the type of access initiated by the user, such as preview, download or the like) and a timestamp for the action. This recent history/recently accessed document information may be used subsequently by the system in connection with the processing of step 134, discussed above. The recent history list may be stored in a non-volatile manner, for example, to a disk based file or persistent database.

As will be readily understood by one of skill in the art, if at any time during step 133 or elsewhere the system receives a new search request or a request to quit, the system will return to step 130 or terminate pursuant to the request received.

While particular embodiments of the present invention have been shown and described, it will be apparent to those skilled in the pertinent art that changes and modifications may be made without departing from the invention in its broader aspects.

What is claimed is:

1. An information search and result processing method for use on a computer processor comprising the steps of:
   (a) providing a content extractor proxy that implements a pre-defined programmatic interface for content extractors;
   (b) receiving from a user a search request;
   (c) retrieving a result set in response to said search request;
   (d) displaying said result set to said user;
   (e) receiving from said user a document request for a document contained in said result set, said document request selected from the group consisting of a preview request to preview said document and a download request to download said document;
   (f) upon receiving a preview request in step (e), providing said user with a preview of said document;

(g) upon receiving a download request in step (e), providing said document for download only after making a determination that said user previously previewed said document; and (h) creating a document popularity value to be used for future result sets for documents contained in said result set of step (c) wherein the popularity value is different for documents that have been both previewed and downloaded in step (g) than documents that have been just previewed in step (f).

2. The method of claim 1, further comprising, upon receiving a download request in step (d), the steps of:
   determining search keywords for said search;
   retrieving a relevant keyword list;
   associating said search keywords with said document;
   merging said search keywords thus associated into said relevant keyword list, resulting in an updated relevant keyword list; and
   saving said updated relevant keyword list.

3. The method claim 1, further comprising, upon receiving a download request in step (d), the step of updating said popularity value for said document.

4. The method of claim 3, wherein said step of updating said popularity value for said document includes the step of incrementing a download counter for said document.

5. The method of claim 3, further comprising, upon receiving a download request in step (d), the steps of:
   determining search keywords for said search;
   retrieving a relevant keyword list;
   associating said search keywords with said document;
   merging said search keywords thus associated into said relevant keyword list, resulting in an updated relevant keyword list; and
   saving said updated relevant keyword list.

6. The method of claim 1, further comprising, upon receiving a preview request in step (d), the step of updating said popularity value for said document.

7. The method of claim 6, wherein said step of updating said popularity value for said document includes the step of incrementing a preview counter for said document.

8. The method of claim 6, further comprising, upon receiving a download request in step (d), the steps of:
   determining search keywords for said search;
   retrieving a relevant keyword list;
   associating said search keywords with said document;
   merging said search keywords thus associated into said relevant keyword list, resulting in an updated relevant keyword list; and
   saving said updated relevant keyword list.

9. The method of claim 6, further comprising, upon receiving a download request in step (d), the step of updating said popularity value for said document in response to said download request.

10. The method of claim 9, wherein said step of updating said popularity value for said document in response to said download request includes the step of incrementing a download counter for said document.

11. The method of claim 9, further comprising, upon receiving a download request in step (d), the steps of:
    determining search keywords for said search;
    retrieving a relevant keyword list;
    associating said search keywords with said document;
    merging said search keywords thus associated into said relevant keyword list, resulting in an updated relevant keyword list; and
    saving said updated relevant keyword list.

12. In an information search and result processing system comprising a computer processor having a recent history list containing references to recently accessed documents, an information search and result processing method comprising the steps of:

(a) providing a content extractor proxy that implements a pre-defined programmatic interface for content extractors;

(b) receiving from a user a search request;

(c) retrieving a result set in response to said search request;

(d) displaying said result set to said user;

(e) receiving from said user a document request for a document contained in said result set, said document request selected from the group consisting of a preview request to preview said document and a download request to download said document;

(f) determining whether said recent history list contains a reference to said document;

(g) upon a determination in step (f) that said recent history list contains a reference to said document, providing said document for download;

(h) upon a determination in step (f) that said recent history list does not contain a reference to said document, determining whether said document request is a preview request or a download request;

(i) upon a determination in step (h) that said document request is a preview request, providing said user with a preview of said document;

(j) upon a determination in step (h) that said document request is a download request, providing said document for download only after making a determination that said user previously previewed said document; and (k) creating a document popularity value to be used for future result sets for documents contained in said result set of step (c) wherein the popularity value is different for documents that have been both previewed and downloaded in step (j) than documents that have been just previewed in step (i).

13. The method of claim 12, further comprising, upon a determination in step (g) that said document request is a download request, the steps of:
    determining search keywords for said search;
    retrieving a relevant keyword list;
    associating said search keywords with said document;
    merging said search keywords thus associated into said relevant keyword list, resulting in an updated relevant keyword list; and
    saving said updated relevant keyword list.

14. The method of claim 12, further comprising, upon a determination in step (g) that said document request is a preview request, the step of updating said popularity value for said document.

15. The method of claim 14, further comprising, upon a determination in step (g) that said document request is a download request, the step of updating said popularity value for said document.

16. The method of claim 15, further comprising, upon a determination in step (g) that said document request is a download request, the steps of:
    determining search keywords for said search;
    retrieving a relevant keyword list;
    associating said search keywords with said document;
    merging said search keywords thus associated into said relevant keyword list, resulting in an updated relevant keyword list; and
    saving said updated relevant keyword list.

17. An information search and result processing method for use on a computer processor comprising the steps of:
- (a) providing a content extractor proxy that implements a pre-defined programmatic interface for content extractors;
- (b) receiving from a user a search request;
- (c) retrieving a result set in response to said search request;
- (d) displaying said result set to said user;
- (e) receiving from said user a preview request to preview a document contained in said result set and providing said user with a preview of said document in response to said preview request;
- (f) receiving from said user a document request requesting an action for said document contained in said result set, said document request selected from the group consisting of: a download request to download said document; a purchase request to purchase said document; a link-to request to create a link to said document; a copy request to copy information from said document; a print request to print said document; and an email request to email said document;
- (g) upon receiving said document request in step (f), providing said requested action only after making a determination that said user previously previewed said document and
- (h) creating a document popularity value to be used in a future result set for documents contained in said result set of step (c) wherein the popularity value is different for documents that have been both previewed and downloaded in step (f) than documents that have been just previewed in step (g).

18. The method of claim 17, further comprising, upon receiving a document request in step (e), the steps of:
  determining search keywords for said search;
  retrieving a relevant keyword list;
  associating said search keywords with said document;
  merging said search keywords thus associated into said relevant keyword list, resulting in an updated relevant keyword list; and
  saving said updated relevant keyword list.

19. The method of claim 18, further comprising, upon receiving a document request in step (e), the step of updating said popularity value for said document.

20. The method of claim 19, wherein said step of updating said popularity value for said document includes the step of incrementing for said document a counter associated with said requested action.

21. The method of claim 20, further comprising, upon receiving a preview request in step (d), the step of updating said popularity value for said document in response to said preview request.

22. The method of claim 21, wherein said step of updating said popularity value for said document in response to said preview request includes the step of incrementing for said document a preview counter.

* * * * *